Aug. 15, 1933.  C. S. JENNINGS ET AL  1,922,699
CONVEYER INSTALLATION
Filed March 23, 1929

Inventor
Chester S. Jennings
Lamont C. Allen
By Roberts, Cushman & Woodbury
Attys.

Patented Aug. 15, 1933

1,922,699

UNITED STATES PATENT OFFICE 1,922,699

CONVEYER INSTALLATION

Chester S. Jennings and Lavont C. Allen, Syracuse, N. Y., assignors to The Lamson Company, Syracuse, N. Y., a Corporation of Massachusetts Application March 23, 1929. Serial No. 349,358

6 Claims. (Cl. 198—203)

This invention relates to an improvement in conveyer apparatus and particularly to means for receiving carriers, containers or articles from a main conveyer and for delivering them onto idler rolls or other suitable supporting means constituting a work station. In many conveyer installations, it is usual to provide a main conveyer, for example of the belt type, upon which containers or articles are carried and distributed to numerous auxiliary conveyers and/or work stations beside the main conveyer. Such stations, for example, may comprise a series of freely rotatable rolls for supporting the articles or carriers, so that after the same have undergone the appropriate operation, the workman may readily despatch the article, as for example, by delivering it to another or the same conveyer. Ordinarily, deflectors comprising pivotally supported arms may be arranged selectively to swing across the path of articles carried by the main conveyer and to divert the same to the various auxiliary conveyers or work stations. The present invention provides a short auxiliary conveyer section which assists in removing the article from the main conveyer,—imparts a definite speed to the article (which may be equal to or greater or less than the speed of the main conveyer),—and which delivers the article, properly oriented, and at a predetermined velocity, into the work station. It is thus made certain that the article will arrive at the proper point within reach of the operator without stopping prematurely or overshooting its proper destination and will come to rest correctly oriented for ready despatch from the station, as for example, by delivery to a secondary conveyer.

In the preferred embodiment of the invention, such means may preferably comprise a short auxiliary conveyer belt which has frictional engagement with the diverted articles so as to impart its own velocity of movement to the same and which straightens the article around so that it will enter the station properly oriented. Preferably the auxiliary conveyer belt is driven through suitable mechanism from the main conveyer so that the auxiliary belt has a positive movement in the direction of movement of the main conveyer and at a predetermined speed. Consequently articles diverted from the main conveyer to one of the auxiliary conveyer belts acquire a definite velocity and pass from the auxiliary conveyer to the idler rolls which comprise the work station at such a predetermined speed that the natural frictional resistance to rotation of these rolls is sufficient to insure the stopping of such articles at a predetermined point within reach of the operator.

Figure 1:
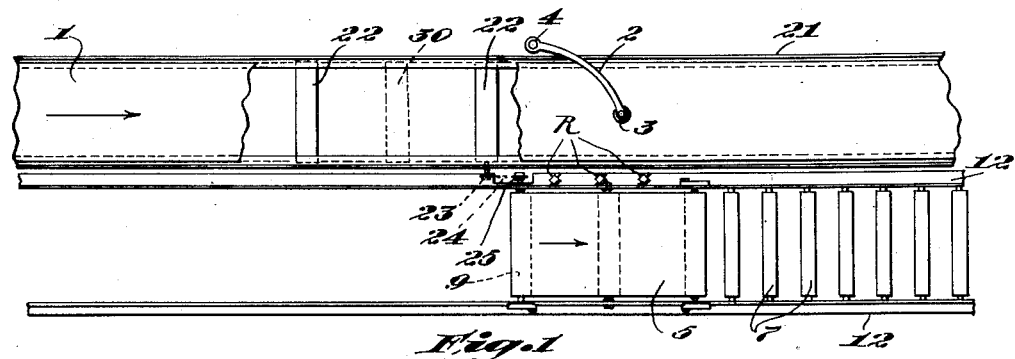
Fig. 1 is a top elevational view of a portion of a main conveyer, a deflector associated therewith, and an auxiliary conveyer and idler rolls comprising a work station,—a part of the main conveyer belt being broken away for clarity of illustration.

Referring to the accompanying drawing which illustrates one concrete exemplification of our invention, it may be seen that the main conveyer belt 1 has its upper run moving in the direction of the large arrow, thus serving as a conveyer to carry boxes or articles to any one of a plurality of work stations situated beside the main conveyer. At these stations suitable operations may be performed upon the conveyed articles, or articles to be treated may be removed from carrier boxes being conveyed by the system. In order to divert the boxes or articles from the main conveyer, a deflector 2 is arranged adjoining each of the auxiliary conveyers and work stations. Such a deflector 2 may be operated in any desired manner, for example being controlled by suitable tabs which are operable in response to the selective positioning of pins upon the carrier boxes after the general manner and mode described in the copending application of J. T. Cowley and L. C. Allen, Serial No. 259,236, filed March 5, 1928, or if desired the deflectors 2 may be hand operated, or any suitable means may be provided for diverting the articles to the work station. Each deflector 2, for example as shown, may comprise a curved arm having one end pivotally supported at one side of the conveyer as designated by numeral 4 and having its opposite end overhanging the same and provided with an anti-friction roller 3. When such a deflector is in operative position as shown in Fig. 1, for example, it is adapted to engage a box or article upon the main conveyer and divert the same to the auxiliary conveyer 5, the latter comprising a short belt section moving in the same direction as the main conveyer and at a predetermined speed. As here shown a plurality of independently freely rotatable rolls 7 are aligned with the belt section 5 and are adapted to receive the articles which pass therefrom. Preferably, anti-friction supporting rolls R are interposed between conveyer belts 1 and 5.

Figure 2:
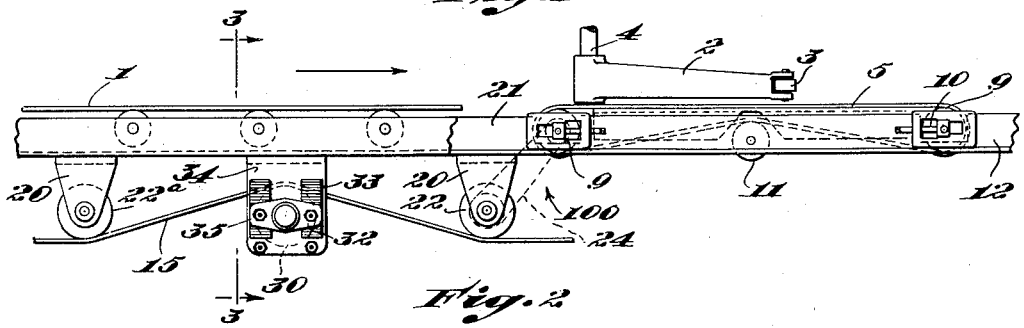
Fig. 2 is a side elevational view of a portion of the main and auxiliary conveyer mechanism shown in Fig. 1.

Fig. 2 illustrates the preferred arrangement of driving means for an auxiliary belt 5. Each end of this belt is mounted upon rolls 9 which may be provided with conventional belt tightening means designated by numerals 10. Intermediate the length of the lower run of the belt is an idler roll 11 which is supported upon the side bars 12 which also support the axles of the rolls 9 and rolls 7. It is evident that the lower run of the belt 7 passes over the idler 11 so that the belt is more positively wrapped about a considerable peripheral portion of rolls 9.

Figure 3:
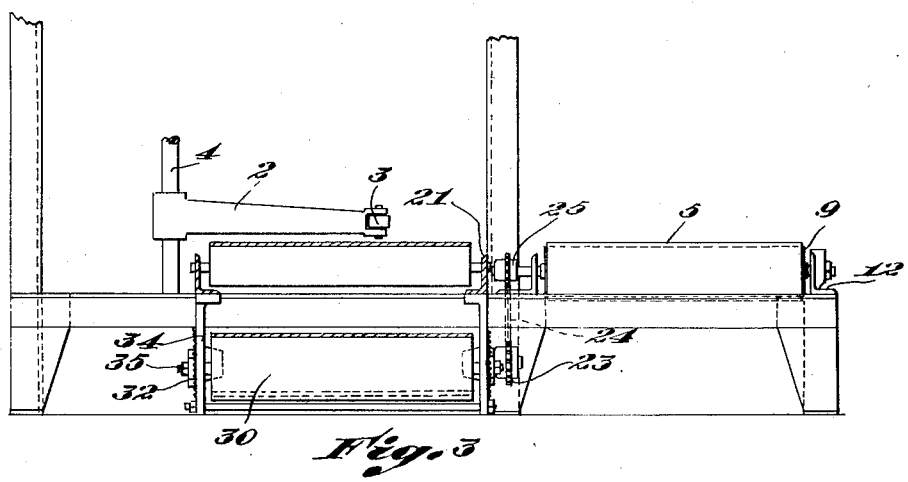
Fig. 3 is a section on line 3—3 of Fig. 2.

One of the latter is driven by suitable driving mechanism 100 receiving power from any suitable source but which preferably is operatively connected to the lower run 15 of the main conveyer belt 1. For this purpose suitable depending brackets 20 are secured to the longitudinal frame elements 21 of the main conveyer, these depending brackets supporting a driving roll 22 which preferably has a width of the same order as that of the belt 1. A sprocket 23, Fig. 3, preferably is fixed to the axis of roller 22, being disposed between the main and auxiliary conveyers and engaging a drive chain 24 that in turn is wrapped about a sprocket 25 keyed to the axle of one of the rolls 9 that support auxiliary belt 7. As here shown by way of example, sprocket 23 has a smaller diameter than roll 22 while sprocket 25 has an even smaller diameter so that the adjoining roll 9 is driven at a lower surface speed than the roll 22. However, sprockets 23 and 25 may be of any necessary relative diameter to insure the desired speed of the auxiliary belt 7.

In order to insure firm frictional engagement of the lower run of the belt with the drive roll 22, we provide an adjustably mounted idler roll 30 that engages the lower portion 15 of the belt 1 so that the latter has an engagement with a greater segmental portion of roller 22. Idler roll 30 may conveniently be mounted on suitable blocks 32, the ends of which are corrugated to engage the corrugated legs 33 of brackets 34 which are secured to the side members 21 of the main conveyer frame. Suitable fastening elements 35 pass through slots in the legs 32 of the brackets and are adapted adjustably to clamp bearing blocks 32 in position; thus the tension of the main conveyer belt may be varied. A second idler 22ª similar to roll 22 may engage the upper face of the lower run of the belt at the other side of roll 30.

It is evident that articles carried by the upper run of the main conveyer belt 1 may be diverted to a work station by a deflector 2, assisted by the auxiliary conveyer belt 5, and may be given the proper velocity by engagement with this power driven belt 5 as they pass to such a station. This belt is adapted to have a positive frictional engagement with the diverted articles or carriers and to pass the same to the idler rolls 7 at a definite speed, so as to insure the stopping of the articles or carriers at the operator's station. This auxiliary belt also straightens out articles partly turned by the action of the deflector 2, so that they enter the station properly oriented for dispatch from the station when the operation is completed.

While in many cases, as here shown, the velocity of the main conveyer belt is greater than that of the auxiliary belt so that the latter acts as a decelerator or snubber, this is not always necessary since the action of the deflector tends to cut down the speed of the article, but in any case the auxiliary belt imparts a definite speed to the article, so predetermined that the article comes to rest at the operator's station, and also assists the deflector in moving the article from off the main conveyer.

Thus this invention permits the main carrier belt to be moved at any desired speed while making it possible to accelerate or decelerate the articles if necessary as they enter the work station so that they will come to rest at the desired point.

We claim:

1. Apparatus of the class described comprising a main conveyer belt, an auxiliary conveyer belt beside a run of the main belt, means for deflecting articles from the main belt to the auxiliary belt, a series of article supporting rolls aligned with the auxiliary belt, a roller engaging a portion of the main belt remote from that portion thereof adjoining the auxiliary belt, and a drive element operatively driven by the roller, said last-named element being operatively connected to the auxiliary belt to drive the latter at a predetermined speed.

2. Apparatus of the class described comprising a main conveyer belt, an auxiliary conveyer belt beside one run of the main belt, means for deflecting articles from the main belt to the auxiliary belt, a series of article supporting rolls aligned with the auxiliary belt, a roller engaging a run of the main belt other than that which adjoins the auxiliary belt, a drive chain operatively driven by the roller, said chain being operatively connected to the auxiliary belt to drive the latter, and an adjustably mounted idler roll engaging the main belt and holding the same in engagement with the periphery of the roller.

3. Apparatus of the class described comprising a main conveyer belt, an auxiliary conveyer belt parallel thereto, and means for driving the auxiliary belt from the main belt, said means comprising rollers in engagement with each of said belts and a driving connection therebetween, and idler rollers engaging each of said belts to cause them to turn about a circumferential portion of the first-named rollers.

4. Apparatus of the class described comprising a main conveyer belt, an auxiliary conveyer belt parallel thereto, and means for driving the auxiliary belt from the main belt, said means comprising rollers in engagement with each of said belts and a driving connection therebetween, idler rollers engaging each of said belts to cause them to turn about a circumferential portion of the first-named rollers and means for adjusting the tension of one of said belts.

5. Apparatus of the class described comprising a main conveyer belt, an auxiliary conveyer belt beside one run of the main belt, means for deflecting articles from the main belt to the auxiliary belt, a series of article supporting rolls aligned with the auxiliary belt, a roller engaging a run of the main belt other than that which adjoins the auxiliary belt, and a drive chain operatively driven by the roller, said chain being operatively connected to the auxiliary belt to drive the latter.

6. Apparatus of the class described comprising a main conveyer belt, a comparatively short auxiliary conveyer belt beside one run of the main belt, rolls supporting the ends of said auxiliary belt, a series of article supporting rolls aligned with the auxiliary belt, a roller engaging a run of the main belt remote from said run which adjoins the auxiliary belt, and a drive element operatively driven by the roller, said element being operatively connected to one of the rolls supporting the auxiliary belt to drive the latter at a speed below that of the main belt.

CHESTER S. JENNINGS.
LAVONT C. ALLEN.